June 4, 1968     W. A. BAJEK     3,386,682

AUTOMATIC CABLE REWIND ASSEMBLY

Filed Sept. 29, 1966

INVENTOR:
Walter A. Bajek

BY: *James R. Hoatson, Jr.*
*Philip J. Liggett*
ATTORNEYS

United States Patent Office 3,386,682
Patented June 4, 1968

3,386,682
AUTOMATIC CABLE REWIND ASSEMBLY
Walter A. Bajek, Lombard, Ill., assignor to Universal
Oil Products Company, Des Plaines, Ill., a corporation of Delaware
Filed Sept. 29, 1966, Ser. No. 583,013
5 Claims. (Cl. 242—107)

ABSTRACT OF THE DISCLOSURE

A flexible cable accumulating assembly including a fixed drum for externally holding an accumulated length of cable, a central threaded shaft member connected to the drum and positioned axially therein, a rotatable sleeve slidably mounted over the shaft member and having matching internal threading engaging the threads of the shaft member, the sleeve member being interconnected with a spring holding reel containing a spiral wound spring adapted to be wound and unwound thereon from a spring storage means mounted adjacent thereto, and a cable winding guide fixedly connecting with the sleeve member, the winding guide having a movable arm extended to circumscribe the side of the drum whereby to wind and unwind the flexible cable on the drum as the sleeve member and guide means are rotated in the wind and unwind directions respectively, and the sleeve member and attached cable winding means being operative to move longitudinally up and down with respect to the drum whereby to effect a spiral winding and unwinding of the flexible cable on the exterior of the drum.

---

Figure 1:
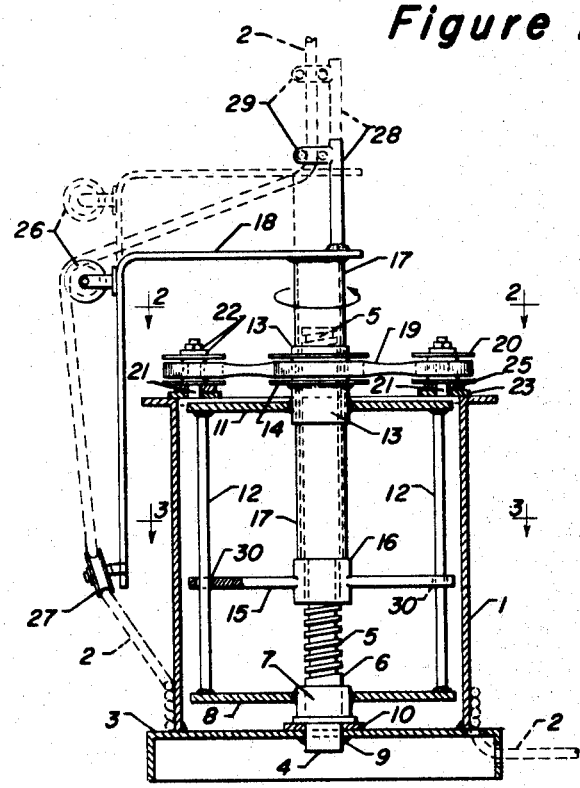

The present invention is directed to a cable rewinding or storage device and more particularly to a unit which incorporates spirally wound spring means to provide a constant torque or force for assisting in the winding or unwinding of the cable onto a storage drum.

There are various types of flexible cable winding or cable storage arrangements which are used or have been tried; however, it seems that most types of units are of a highly complex construction embodying gearing and/or electric motor means to effect the winding or unwinding of the cable onto a storage drum. In the present instance, there is a construction system which provides for the use of one or more spirally wound spring means embodied within a simplified construction and arrangement for a cable winding operation. Where there is a relative short length of light weight cable to be stored periodically during the use of the cable system, then one spring unit may be embodied in an assembly. On the other hand, where a relatively long length of heavy weight cable is to be utilized in a moving cable system, then two or more spring motor units may be embodied into the construction and arranged to provide for an easily operated apparatus.

In one instance, the present type of cable storage unit has been used where a continuous unspliced coax cable is required to be stored on a drum assembly for use with an interface detector apparatus. Such apparatus has a probe or sensing element which can be lowered into or used adjacent to a chemical processing vessel to determine a particular interface level within such vessel. Actually, in order to preclude having an uncontrolled looping of coax cable in the zone of the processing equipment the extra length of cable extending between the probe and the radiation detector or read-out device is wound on the cable storing apparatus of the present invention to maintain a temporary storage of such cable. It should also be noted that where random coiling of a coax cable is permitted there can be interference with the transmission through the cable and resulting inaccurate readings. In one aspect, it may be considered a principal object of the present invention to provide a cable storing assembly which is capable of operating to exert a substantial constant type of assisting force in effecting the winding of an excess length of cable onto a fixed position storage drum, or to aid in effecting a uniform unwinding of stored cable.

It may also be considered an object of the present invention to provide a relatively simplified construction which has a substantially constant torque winding and unwinding arrangement along with threaded means integrated therein to effect the movement of the cable winding guide arrangement longitudinally up and down over the face of the storage drum such that a non-lapping spiral winding of the cable can be accomplished on the surface of the drum.

Broadly, the present invention may be considered to provide a device for accumulating or storing flexible cable, which comprises in combination, a fixed position drum for externally holding accumulated cable, a central shaft member connecting to said drum and positioned axially therein, a rotatable sleeve member mounted on said axial shaft member, said sleeve member interconnecting with a spring holding reel positioned to encompass the sleeve and providing for spiral wound spring means to be wound and unwound thereon from at least one spiral wound spring coil means mounted adjacent thereto, said rotatable sleeve member further connecting with a cable winding guide means, the latter having a movable bent arm extending in a manner to circumscribe the side of said drum whereby to effect the winding and unwinding of the flexible cable on said drum as the sleeve member and guide means rotate in respectively the wind and unwind directions with respect to said drum.

A preferred embodiment of the storing apparatus utilizes a special form of spiral wound spring in order to provide a substantially constant tension or force, regardless of the amount or length of spring that has been extended from the coil. A conventional spiral wound spring of flat spring materials, which is in the nature of a clock type spring, will have a varying degree of tension depending upon the amount of unwind from the core of the spring. By the use of special forms of spiral wound springs that have been given a particular curvature, such that the cross-sectional portion of the spring element is not flat, there may be obtained a substantially constant force or torque exerted by the action of the spring unit, whether it be in a substantially unwind or wind position. (One well known form of spring steel spring having curvature built into the spring is the "Neg'ator" spring, a trade name used by Hunter Spring Division of Ametek Inc. Hatfield, Pa.)

Also in a preferred form of the present improved construction which is used to accommodate a relatively long length of stored cable, there shall be utilized a threaded central shaft section and threaded engagement means therewith connecting to the cable winding means or guide means such that the cable is wound on the storage drum in a non-overlapping spiral over the external circumference of the drum. On the other hand, where a relatively short length of cable is to be handled and it is of a relatively small diameter type cable, there may be utilized a relatively large diameter fixed drum and cable winding arm means moving therearound which permits overlapping of the cable itself.

Reference to the accompanying drawing and the following description thereof will serve to more clearly set forth the constructional arrangement of the present invention and point out additional advantageous operating features in connection therewith.

FIGURE 1 of the drawing is a sectional elevational view indicating a preferred embodiment of the unit, utilizing spiral wound spring means and a threaded central shaft for effecting spiral winding and storage of the cable on the drum section.

Figure 2:
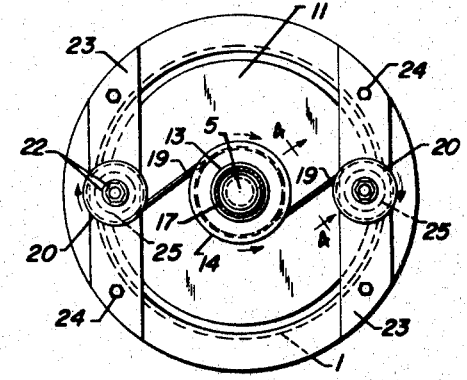

FIGURE 2 of the drawing is a sectional plan view of the upper portion of the storage unit, indicating an arrangement with two spiral wound spring motor means.

Figure 3:
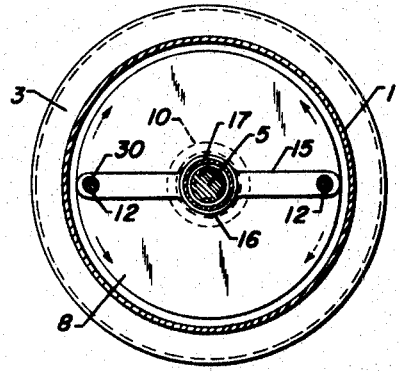

FIGURE 3 of the drawing is a horizontal sectional view, indicating primarily the internal construction and arrangement of the assembly.

Figure 4:

FIGURE 4 indicates, in a simple cross-sectional type view, that the cross-section of the spring element has a rolled in curvature capable of exerting a substantially constant tension or force regardless of the amount of unwind or wind of the spring coil unit.

Figure 5:
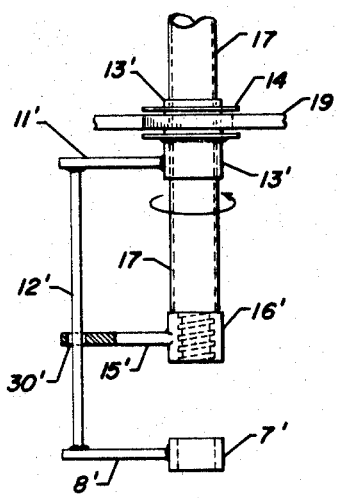

FIGURE 5 indicates, in an elevational a view, modified internal construction, where single arm members are utilized from the central shaft portion in lieu of upper and lower plates and a double arm construction from the threaded hub section.

Referring now particularly to FIGURES 1 and 2 of the drawing, there is shown a drum section 1 adapted to hold or store multiple winds of one continuous cable such as indicated by the dotted lines 2. The drum 1 is normally mounted or otherwise held in a fixed position from a base section 3 and is provided with an upper stiffening flange. Extending vertically and axially upward through the drum section 1 is a center shaft member 4 with an elongated threaded section 5. Preferably the lower portion of the shaft member 4 is provided with a non-threaded smooth section 6 in order that it might provide a bearing zone for a collar or hub section 7 at the center of a lower horizontal disc member 8. The lower end of the shaft 4 is indicated as being held by weld means 9 to the lower portion of the base plate 3 and that bronze washer means 10 is inserted below the hub section 7 in order that the latter might rotate freely around the shaft portion 6 during the wind and unwind operation of the cable unit.

An upper horizontal plate or disc member 11 connects to the lower horizontal plate 8 by way of vertical rod members 12. The upper plate member 11 has a central hub section 13 in turn fixedly connective with a spring holding reel 14. Thus, the latter is caused to rotate in unison along with the horizontal plate members 8 and 11 and connector rods 12. Intermediately between disc members 8 and 11 are arm sections 15 which extend from an internally threaded hub section 16. Arms 15 have slots or open hole portions 30 to provide a slip-fit around the vertical bar members 12 to thus, in turn, provide bearing against and a rotation for the members 8 and 11 and for reel 14. The upper portion of hub section 16 is fixedly connected to a hollow sleeve or tubular member 17 which encompasses the shaft 5 but does not engage or otherwise come into contact with it. The sleeve 17 in turn passes in a slip-fit through the center of hub section 13 and the reel 14 to connect with cable guide bar 18. Thus, as may be observed from the drawing, when there is rotation from the cable guide means 18 and the hollow sleeve member 17, there will be a corresponding rotation of the arms 15 from hub 16 and a bearing exerted against vertical bars 12 that discs 8 and 11 turn therewith. The rotation of disc or plate 11 and hub 13 in turn leads to the rotation of reel 14 which connects with the springs 19 from coiled spring units 20.

As shown in both FIGURES 1 and 2, spiral wound spring units 20 are mounted on pins or shafts 21 by washer and castle nut means 22. Pin means 21 are in turn supported from plate members 23 with the latter indicated as being removably mounted and supported from the upper stiffening flange by bolt means 24. In addition, suitable bronze washers 25 are provided between the plates 23 and the lower faces of the reels or spring units 20.

Also, as best shown by FIGURE 4 of the drawing, a preferable embodiment of cable storing device provides that the spring units 20 in turn utilize pre-rolled or curved spring steel means 19. Where the springs are of a special configuration providing curvature to the spring strip, such as noted hereinbefore, there can be prestressing built into the spiral wound spring 19 such that there is in turn a constant tension from spring units 20, regardless of the amount of spring wind or unwind. Further, it may be noted that the arrangement of FIGURE 2 provides two spring units 20 and two special spring means 19 to connect with reel 14 and to hub 13 and through internal disc or plate members 8 and 11 to rods 12 and then through arms 15 to sleeve 17 for providing pull or assistance in the winding of the cable 2 around the drum 1. The solid arrows indicated in FIGURES 1 and 2 show that the guide arm 18 shall in turn work through pulleys 26 and 27 to feed the cable 2 onto the drum 1 and effect a winding of such cable in a counterclockwise movement. Conversely, as shown by the arrows in dashed lines, there will be an unwinding of the spring 19 from reels 20 as the cable guide means 18 is rotated in a clockwise direction to effect an unwind of cable 2. In any case, it will be observed that it is a particular feature of the present improved storage assembly to make use of the spiral wound spring means 20 which can provide a substantially uniform tension to the winding and unwind operations regardless of position of cable or of the amount of cable which has been wound or unwound from the storage drum 1.

With further reference to FIGURE 1 of the drawing, it should be noted that the cable arm 18 has a superposed post or rod section 28 with a guide loop 29 for maintaining a suitable alignment of cable means 2. In order to minimize friction, the guide loop or ring 29 shall have a liner of Teflon or, alternatively, be of a roller bearing construction. It will also be noted from the dashed lines for the cable guide bar 18 and the guide ring 29 that there will be a raising and lowering of the entire cable guide assembly along with the hollow sleeve member 17 as the latter is raised upwardly and downwardly from the threaded hub section 16 on threaded shaft 5. In other words, as the shaft 17 rotates in a counterclockwise direction as shown by the arrows, there will be a gradual raising of the hub member 16, hollow sleeve 17 and arms 15 with a sliding of the sleeve 17 upwardly through hub 13 as well as through reel 14 which connects with the springs 19. Conversely, as the guide arm 18 and shaft portion 17 rotate in a clockwise and unwind direction with respect to the cable 2 on drum 1, there will be a gradual lowering of the sleeve portion 17 with the hub portion 16 on threaded shaft 5. The raising and lowering of the cable guide arm 18 is of course to provide a non-lapping spiral winding of cable 2 around the drum means 1.

Various arrangements may be provided in the way of cable guide arm means and pulleys of loops to effect the suitable alignment and guidance of cable 2 in effecting the wind and unwind operations on the fixed drum 1. Thus, there need not be any one specific assembly within the scope of the present invention nor a limitation to the use of two particular pulleys such as 26 and 27 indicated in the present drawing.

Further, it is not intended to limit the present design and arrangement to any one type of threaded shaft means such as 5, inasmuch as varying threaded arrangements may be utilized, including the use of square cut threads or a Saginaw type of rounded thread, such as indicated in FIGURE 1. Actually, the size and pitch of the threading on shaft 5 shall conform to the size and type of cable means 2 that is to be stored on the drum 1 whereby a suitable nonoverlapping spiral wind of the cable can be readily maintained on the surface of the drum 1. It may also be pointed out that modifications may be made within the scope of the present invention with respect to the positioning or arrangement of spiral wound spring means such as 20, whereby a great or lesser number of coiled spring units are embodied within the assembly to assist in the winding operations. The present drawing indicates two units 20 working in combination with one another by virtue of their mode of attachment to reel member 14. However, an additional one or two reels such as 20 may be provided to work in combination with the present arrangements, particularly where long lengths of heavy cable are to be handled for storage on the fixed drum section 1.

Reference to FIGURE 5 of the drawing, indicates a modification in the construction of moving internal portions of the assembly by virtue of having rotating sleeve means 17 connective with a hub section 16' which in turn has a single arm section 15' with a hole or slotted portion 30' adapted to contact vertical bar means 12' which in turn is fixedly connected between upper and lower arm sections 8' and 11'. The lower arm section 8' connects with a lower hub section 7' while the upper arm section 11' connects with hub section 13' and a reel 14. Thus, the latter will rotate in unison with the cable guide arm means that connects to sleeve 17 and effect the winding or unwinding of the spring means 19 in the manner of FIGURE 1. In other words, the embodiment of FIGURE 5 merely provides a simplification of the internal construction of the assembly and a replacement of the larger upper and lower plate sections, such as indicated by numerals 11 and 8 in FIGURE 1 of the drawing.

The present drawing indicates the drum section 1 as having a height equal to or somewhat greater than its diameter whereby a relatively large intermediate length of a continuous cable may be stored by a multiplicity of spiral winds around the cylindrical surface of drum section 1; however, where smaller lengths of cable are to be accommodated, then drum height 1 may be somewhat less and have an $L/D$ ratio which is substantially less than one. Actually, as noted previously hereinbefore, the storage of a cable can be accommodated on a drum or reel without the necessity for effecting a spiral winding thereon and there can be the elimination of the threading on the inner solid shaft section such as 5 along with an elimination of internal threading for hub section 16 whereby there is no raising or lowering of the guide arm 18. However, in this event, where multiple turns are to be made in storing a cable, there will of course be an overlapping of the cable on the external surface of the drum section and a less preferred form of storage.

I claim as my invention:

1. A flexible cable accumulating assembly, which comprises in combination, a fixed position drum for externally holding an accumulated length of continuous cable, a central threaded shaft member connecting to said drum and positioned axially therein, a rotatable sleeve member slidably mounted over said shaft member and having matching internal threading along at least a portion of its length engaging the threads of said shaft member, said sleeve member being interconnected with a spring holding reel and providing for a spiral wound spring means to be wound and unwound thereon from at least one spiral wound spring storage means mounted adjacent thereto, and cable winding guide means fixedly connecting with said sleeve member, said guide means having a movable bent arm extending in a manner to circumscribe the side of said drum whereby to effect the winding and unwinding of the flexible cable on said drum as the sleeve member and guide means rotate in respectively the wind and unwind directions with respect to said drum, said sleeve member and the attached cable winding means being operative to move longitudinally up and down with respect to said drum and to effect a spiral winding and unwinding of the flexible cable on the exterior of the drum.

2. The flexible cable accumulating assembly of claim 1 further characterized in that arm means are provided from said sleeve member within the interior of said drum and extend to slidably bear against arm means extending from a hub section connective with said spring holding reel, whereby the latter will rotate in unison with said sleeve member although not fixedly connected thereto and, in addition, whereby the sleeve member can slide up and down through the spring holding reel as the cable is being wound and unwound over the drum.

3. The flexible cable accumulating assembly of claim 1 further characterized in that said drum has an elongated cylindrical form permitting a spiral winding of a flexible cable thereon.

4. The flexible cable accumulating assembly of claim 1 further characterized in that said drum has a larger diameter than height providing for the winding of a substantial length of flexible cable with a single complete turn of said sleeve means.

5. The flexible cable accumulating assembly of claim 1 further characterized in that a cable guide loop means is carried by said cable winding guide means, the guide loop means being spaced from said winding guide means and being adapted to enclose and guide the flexible cable with minimal frictional contact therewith.

References Cited

UNITED STATES PATENTS

| | | | |
|---|---|---|---|
| 973,553 | 10/1910 | Peacock | 242—107 |
| 1,587,437 | 6/1926 | Sturge | 242—107 |
| 3,020,567 | 2/1962 | Colt | 242—107 X |
| 3,322,372 | 5/1967 | Hellstrom | 242—107 |

WILLIAM S. BURDEN, *Primary Examiner.*